US008574771B2

(12) United States Patent
Kim et al.

(10) Patent No.: US 8,574,771 B2
(45) Date of Patent: Nov. 5, 2013

(54) RECHARGEABLE LITHIUM BATTERY

(75) Inventors: Hyun-Seok Kim, Yongin-si (KR); Heon-Cheol Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1198 days.

(21) Appl. No.: 11/647,771

(22) Filed: Dec. 29, 2006

(65) Prior Publication Data

US 2007/0154810 A1    Jul. 5, 2007

(30) Foreign Application Priority Data

Dec. 30, 2005    (KR) .................. 10-2005-0135443

(51) Int. Cl.
*H01M 6/14*    (2006.01)
(52) U.S. Cl.
USPC .......................................... 429/303; 429/324
(58) Field of Classification Search
USPC ....................................................... 429/303
See application file for complete search history.

(56) References Cited

U.S. PATENT DOCUMENTS

| | | | | |
|---|---|---|---|---|
| 5,427,874 A * | 6/1995 | Sugeno | ............................ | 429/342 |
| 6,391,495 B1 * | 5/2002 | Choi et al. | .................. | 429/231.4 |
| 6,511,769 B1 * | 1/2003 | Jung et al. | ......................... | 429/62 |
| 6,805,996 B2 | 10/2004 | Hosoya | | |
| 2002/0039677 A1 * | 4/2002 | Iwamoto et al. | ............... | 429/122 |
| 2005/0014072 A1 * | 1/2005 | Yamaguchi et al. | ........... | 429/329 |

FOREIGN PATENT DOCUMENTS

| | | |
|---|---|---|
| CN | 1237003 A | 12/1999 |
| JP | 3-704589 B2 | 8/2005 |
| KR | 2000-0073252 | 12/2000 |
| KR | 2000-0075395 | 12/2000 |
| KR | 10-2001-0020108 | 3/2001 |
| KR | 10-2005-0008446 | 1/2005 |

OTHER PUBLICATIONS

Kuribayashi et al. "Battery characteristics with various carbonaceous materials" Journal of Power Sources vol. 54 pp. 15 (1995).*
Korean Patent Abstracts, Publication No. 1020010020108 A; Date of Publication: Mar. 15, 2001; in the name of Se Min Oh.
Korean Patent Abstracts, Publication No. 1020050008446 A; Date of Publication: Jan. 21, 2005; in the name of Ryuichi Shimizu et al.
Korean Patent Abstracts, Publication No. 1020000073252 A, Published on Dec. 5, 2000, in the name of Choi, et al.
Korean Patent Abstracts, Publication No. 1020000075395 A, Published on Dec. 15, 2000, in the name of Hwang, et al.
SIPO Office action dated Jul. 5, 2011, for corresponding Chinese Patent application 200610064192.8, with English translation, as well as U.S. Patent 5,427,874 previously cited in U.S. Office action dated Feb. 1, 2010.

(Continued)

*Primary Examiner* — Ula C Ruddock
*Assistant Examiner* — Jacob Marks
(74) *Attorney, Agent, or Firm* — Christie, Parker & Hale, LLP (57) ABSTRACT

A rechargeable lithium battery is provided. The battery includes an electrolyte including a lithium salt, a non-aqueous organic solvent including an ethylene carbonate-based compound and a pyrocarbonate-based additive; a negative electrode that includes a negative active material including a crystalline-based carbon core and an amorphous-based carbon shell surrounding the crystalline-based carbon core; and a positive electrode comprising a positive active material.

13 Claims, 2 Drawing Sheets

(56) References Cited

OTHER PUBLICATIONS

Patent Abstracts of Japan, and English machine translation of Japanese Laid Open publication 09-245831, corresponding to JP 3-704589 listed above, 8 pages.

SIPO Office action dated Nov. 3, 2011, for corresponding Chinese Patent application 200610064192.8, with English translation, 10 pages.

SIPO Office action dated Jan. 8, 2013, for corresponding Chinese Patent application 200610064192.8, with English translation of p. 1, (6 pages).

* cited by examiner

FIG. 1

RECHARGEABLE LITHIUM BATTERY

CROSS-REFERENCE TO RELATED APPLICATION

This application claims priority to and the benefit of Korean Patent Application No. 10-2005-0135443 filed in the Korean Intellectual Property Office on Dec. 30, 2005, the entire content of which is incorporated herein by reference.

FIELD OF THE INVENTION

The present invention relates to rechargeable lithium batteries.

BACKGROUND OF THE INVENTION

Recently, reductions in the size and weight of portable electronic equipment has led to the development of batteries for use in the portable electronic equipment. These batteries should have both high performance and large capacity characteristics. Furthermore, these batteries should be reliable and safe and be produced in a cost effective manner.

Batteries are generally classified as primary batteries (which can be used only once and are then disposed of) and secondary batteries (which can be recharged and used repeatedly). Primary batteries include manganese batteries, alkaline batteries, mercury batteries, and silver oxide batteries. Secondary batteries include lead-acid storage batteries, nickel-metal hydride (Ni-MH) batteries, sealed nickel-cadmium batteries, lithium metal batteries, lithium ion batteries, lithium polymer batteries, and lithium-sulfur batteries.

Lithium rechargeable batteries generate electric power using electrochemical reaction materials ("active materials") for both the positive electrode and the negative electrode. Critical factors for determining battery performance (such as capacity, cycle-life, power, safety, and reliability) include the electrochemical characteristics and thermal stability of the active materials used. Thus, extensive research has been undertaken to improve these characteristics of positive and negative active materials.

Of the currently available active materials for the negative electrode, lithium metal has high electric capacity per unit mass and high electro negativity. Thus, lithium metal can be well adapted for use in high capacity and high voltage battery cells. However, since it is difficult to ensure the safety of a battery using lithium metal, other materials capable of reversibly deintercalating and intercalating lithium ions are being used as the negative active materials in rechargeable lithium batteries.

Lithium rechargeable batteries generate electrical energy from changes in chemical potential during intercalation/deintercalation of lithium ions at the positive and negative electrodes. Lithium rechargeable batteries use positive and negative active materials that reversibly intercalate or deintercalate lithium ions during charge and discharge reactions. The lithium rechargeable batteries also contain organic electrolytes or polymer electrolytes positioned between the positive and negative electrodes.

The electrolyte may include a cyclic carbonate having a high dielectric constant (such as propylene carbonate, ethylene propylene carbonate, and so on) and a linear carbonate having low viscosity (such as diethyl carbonate, methylethyl propylene carbonate, dimethyl carbonate, and so on). The electrolyte may include a mixed solvent including a cyclic carbonate and a linear carbonate.

However, such an electrolyte is easily decomposed on an electrically active electrode, and the decomposed product may increase internal resistance of the battery. Accordingly, charge and discharge characteristics of the battery deteriorate and cycle-life decreases.

The information disclosed in this Background section is provided for enhancing the understanding of the present invention and may contain information that is not prior art or that is already known to persons of ordinary skill in the art.

SUMMARY OF THE INVENTION

In one exemplary embodiment of the present invention, a rechargeable lithium battery has improved low temperature characteristics.

According to another embodiment of the present invention, a rechargeable lithium battery includes an electrolyte, a negative electrode, and a positive electrode. In one embodiment, the electrolyte includes a lithium salt, a non-aqueous organic solvent including an ethylene carbonate-based compound, and a pyrocarbonate-based additive. In another embodiment, the negative electrode includes a negative active material including a crystalline-based carbon core and an amorphous-based carbon shell surrounding the crystalline-based carbon core. The positive electrode includes a positive active material.

BRIEF DESCRIPTION OF THE DRAWINGS

The above features of the present invention will be better understood by reference to the following detailed description when considered in conjunction with the accompanying drawings, in which.

DETAILED DESCRIPTION

Exemplary embodiments of the present invention will now be described with reference to the accompanying drawings.

In order to develop large-sized commercially viable batteries, it is important to improve the power output at low temperatures as well as the cycle-life characteristics. Particularly, rechargeable lithium batteries including ethylene carbonate-based electrolyte systems have extremely low power output at low temperatures. The power output at low temperatures is affected by the Solid Electrolyte Interface (SEI) layer formed on the surface of the electrode rather than the ion-conductivity of the electrolyte.

According to one embodiment of the invention, a rechargeable lithium battery includes an electrolyte comprising a pyrocarbonate-based compound additive for decreasing the resistance of the SEI layer at low temperatures. The lithium battery may further include an amorphous-based carbon on the surface of the negative active material that contacts the electrolyte. This amorphous-based carbon is a shell, preventing reactions with the electrolyte and decreasing the irreversible capacity of the negative electrode. This makes it possible to realize a battery having high capacity.

A rechargeable lithium battery according to one embodiment of the present invention includes an electrolyte including a lithium salt, a non-aqueous organic solvent including an ethylene carbonate-based compound, and a pyrocarbonate-based additive. The lithium battery further includes a positive electrode including a positive active materials, and a negative electrode including a negative active material including a crystalline-based carbon core and an amorphous carbon shell surrounding the crystalline-based carbon core.

According to one embodiment of the present invention, the electrolyte includes a lithium salt, a non-aqueous organic solvent that includes an ethylene carbonate-based compound, and a pyrocarbonate-based additive. The lithium salt is dissolved in the non-aqueous organic solvent to supply lithium ions in the battery. The lithium salt facilitates the basic operation of the rechargeable lithium battery and facilitates movement of lithium ions between positive and negative electrodes. Non-limiting examples of suitable lithium salts include $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, and lithium bis(oxalato) borate. In one embodiment, the concentration of the lithium salt ranges from about 0.1 to about 2.0 M. When the concentration of the lithium salt is less than about 0.1 M, the electrolyte performance is deteriorated due to its ionic conductivity. When the concentration of the lithium salt is greater than about 2.0 M, lithium ion mobility decreases due to increases in electrolyte viscosity.

The non-aqueous organic solvent acts as a medium for moving ions taking part in the electrochemical reaction of the battery. In one embodiment, the non-aqueous organic solvent includes an ethylene carbonate-based compound. Nonlimiting examples of suitable ethylene carbonate-based compounds include compounds represented by the following Formula 1 and combinations thereof.

(1)

In Formula 1, each of X and Y is independently selected from hydrogen, halogens, cyano (CN) groups, nitro ($NO_2$) groups, and C1 to C5 haloalkyl groups. At least one of X and Y is selected from halogens, cyano (CN) groups, nitro ($NO_2$) groups, and C1 to C5 haloalkyl groups. In one embodiment, the haloalkyl group is a fluoroalkyl group.

According to one embodiment, the ethylene carbonate-based compound is selected from ethylene carbonate, fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and combinations thereof. For example, in one embodiment, the ethylene-carbonate based compound is fluoroethylene carbonate.

In one embodiment, the ethylene carbonate-based compound is present in an amount ranging from about 10 to about 60 wt % based on the total weight of the electrolyte. In another embodiment, the ethylene-carbonate based compound is present in an amount ranging from about 15 to about 40 wt % based on the total weight of the electrolyte. When the amount of the ethylene carbonate-based compound is less than about 10 wt %, the film formed on the surface of the negative electrode is insufficient and cycle-life characteristics deteriorate. When the amount of the ethylene carbonate-based compound is more than 60 wt %, electrolyte viscosity is too high and cycle-life characteristics deteriorate.

According to another embodiment of the present invention, the non-aqueous organic solvent may further include a linear carbonate-based compound in addition to the ethylene carbonate-based compound. Nonlimiting examples of suitable linear carbonates include dimethyl carbonate, diethyl carbonate, ethylmethyl carbonate, methylpropyl carbonate, ethyl butyrate, methyl butyrate, and combinations thereof.

When the electrolyte further includes a linear carbonate-based compound, a mixture of the ethylene carbonate-based compound and the linear carbonate-based compound may be provided in a volume ratio ranging from about 1:1 to about 1:9. When the volume ratio is within this range, electrolyte performance is enhanced.

The pyrocarbonate-based additive reduces and decomposes earlier and faster than the ethylene carbonate-based non-aqueous organic solvent to form an SEI layer on the negative electrode surface. The resultant SEI layer including the pyrocarbonate-based additive has decreased resistance at low temperatures, which resistance is lower than that of the SEI layer formed by decomposition of an ethylene carbonate-based non-aqueous organic solvent.

In one embodiment, the pyrocarbonate-based additive may include a compound represented by the following Formula 2, and combinations thereof.

(2)

In Formula 2, each of $R_1$ and $R_2$ is independently selected from C1 to C16 alkyl groups and C1 to C16 haloalkyl groups.

Nonlimiting examples of suitable pyrocarbonate-based additives include dimethylpyrocarbonate, diethylpyrocarbonate, methylethylpyrocarbonate, methylpropylpyrocarbonate, methylbutylpyrocarbonate, methyldecylpyrocarbonate, ethyldodecylpyrocarbonate, ethylcetylpyrocarbonate, di-2-ethylhexylpyrocarbonate, di-tert-butyl pyrocarbonate, and combinations thereof.

In one embodiment of the present invention, in the above Formula 2, each of $R_1$ and $R_2$ is independently selected from C1 and C2 alkyl groups. Nonlimiting examples of suitable pyrocarbonate-based additives for use with this embodiment include dimethylpyrocarbonate, diethylpyrocarbonate, and methylethylpyrocarbonate.

According to one embodiment, the pyrocarbonate-based additive is present in an amount ranging from about 0.01 to about 5 wt % based on the total weight of the electrolyte. In another embodiment, the pyrocarbonate-based additive is present in an amount ranging from about 0.5 to about 3 wt % based on the total weight of the electrolyte. When the amount of the pyrocarbonate-based additive is less than about 0.01 wt %, it is difficult to sufficiently decrease resistance at low temperatures. On the other hand, when the amount of the pyrocarbonate-based additive is greater than about 5 wt %, the pyrocarbonate-based additive self decomposes to produce $CO_2$, and the $CO_2$ deteriorates battery capacity.

In another embodiment of the present invention, in addition to the pyrocarbonate-based additive, the electrolyte may further include any conventional additive commonly used for improving battery characteristics.

According to another embodiment of the present invention, the negative electrode includes a negative active material including a crystalline-based carbon core and an amorphous-based carbon shell surrounding the crystalline-based carbon core.

One embodiment of a method for preparing the negative active material includes mixing a crystalline-based carbon and an amorphous carbon precursor to chemically bond them together, removing the amorphous-based carbon precursor that did not take part in the chemical bonding reaction, preparing a graphite and amorphous-based carbon precursor complex from the chemical bonding reaction and heating the graphite and amorphous-based carbon precursor compound.

According to one embodiment, the crystalline-based carbon may include a natural graphite or an artificial or synthesized graphite. In one embodiment, for example, the crystalline-based carbon includes a natural graphite. In another embodiment, the crystalline-based carbon may include a graphite taking any suitable shape, such as a sphere, a sheet, or a fiber. For example, in one embodiment, the crystalline-based carbon includes a spherical graphite.

In choosing the crystalline-based carbon, regardless of the type or charge and discharge efficiency, the carbon material should have high capacity and high energy density.

According to another embodiment of the invention, the amorphous-based carbon precursor may include a hard carbon precursor or a soft carbon precursor. Nonlimiting examples of suitable hard carbon precursors include polyimide resins, furan resins, phenol resins, polyvinylalcohol resins, cellulose resins, epoxy resins, and polystyrene resins. Nonlimiting examples of suitable soft carbon precursors include oil-based materials such as petroleum pitches, coal pitches, and low molecular weight heavy oils.

According to one embodiment, the amorphous-based carbon precursor is dissolved in an organic solvent such as tetrahydrofuran, an alcohol such as methanol, or an aqueous solution, to provide a solution. Then, a crystalline-based carbon is mixed with the solution and the mixture is subjected to a reflux reaction. The remaining amorphous-based carbon precursor that did not take part in the chemical bond formed from the reflux reaction is removed by filtering the refluxed solution to provide a negative active material precursor powder. The negative active material precursor powder is heated at a temperature ranging from about 700 to about 1400° C. to provide a negative active material including a crystalline-based carbon core and an amorphous-based carbon shell.

According to one embodiment, the crystalline-based carbon core of the negative active material has an average particle size ranging from about 5 to about 30 μm. In another embodiment, the crystalline-based carbon core has an average particle size ranging from about 5 to about 25 μm. When the average particle size is smaller than about 5 μm, the final active material size is too small and a side reaction will likely occur during charge and discharge. When the average particle size is greater than about 30 μm, the active material size is too large to obtain a sufficiently high filling density upon fabricating the electrode plate.

According to one embodiment of the present invention, the distance ($d_{002}$) between layers of (002) surfaces of the crystalline-based carbon core part of the negative active material, when measured in accordance with X-ray diffraction analysis, ranges from about 3.35 to about 3.42 Å. According to another embodiment, the ratio ($I_{1360}/I_{1580}$) of the peak value at 1360 cm$^{-1}$ to the peak value at 1580 cm$^{-1}$, measured by argon ion laser Raman spectroscopy, ranges from about 0.05 to about 0.4.

According to another embodiment, the amorphous-based carbon shell has an average thickness ranging from about 10 to about 3000 Å. In another embodiment, the amorphous-based carbon shell has an average thickness ranging from about 10 to about 2000 Å. When the average thickness of the shell is less than about 10 Å, the thickness of the amorphous-based carbon layer is insufficient for the reaction between the crystalline-based carbon core and the non-aqueous organic solvent to occur, thereby likely deteriorating battery capacity. When the average thickness of the shell is greater than about 3000 Å, the relative amount of the crystalline-based carbon core is too small and the voltage flatness of the battery including the active material may deteriorate.

According to one embodiment of the present invention, the distance ($d_{002}$) between layers of (002) surfaces of the amorphous-based carbon shell part of the negative active material, when measured in accordance with X-ray diffraction analysis, ranges from about 3.34 to about 3.80 Å. In another embodiment, the distance ($d_{002}$) ranges from about 3.34 to about 3.70 Å. According to another embodiment, the ratio ($I_{1360}/I_{1580}$) of the peak value at 1360 cm$^{-1}$ to the peak value at 1580 cm$^{-1}$, measured by argon ion laser Raman spectroscopy, ranges from about 0.3 to about 1.5.

According to one embodiment, the negative electrode may be fabricated by a method including mixing the negative active material, a binder, and optionally a conductive agent to provide a slurry composition, and coating the slurry composition on a current collector such as copper foil.

In one embodiment, the positive electrode includes a positive active material selected from compounds capable of reversibly intercalating and deintercalating lithium ions (lithiated intercalation compounds), compounds capable of producing lithium-containing compounds by reversibly reacting with lithium, and combinations thereof. In one embodiment, for example, the positive active material includes one of cobalt, manganese, nickel, composite lithium oxides, and combinations thereof. Nonlimiting examples of suitable composite lithium oxides include lithium-containing compounds represented by the following Formulae 3 to 20.

$$LiNiO_2 \quad (3)$$

$$LiCoO_2 \quad (4)$$

$$LiMnO_2 \quad (5)$$

$$LiMn_2O_4 \quad (6)$$

$$Li_aNi_bB_cM_dO_2 \quad (7)$$

In Formula 1 through 7, $0.90 \leq a \leq 1.1$, $0 \leq b \leq 0.9$, $0 \leq c \leq 0.5$, and $0.001 \leq d \leq 0.1$.

$$Li_aNi_bCo_cMn_dM_eO_2 \quad (8)$$

In Formula 8, $0.90 \leq a \leq 1.1$, $0 \leq b \leq 0.9$, $0 \leq c \leq 0.5$, $0 \leq d \leq 0.5$, and $0.001 \leq e \leq 0.1$ $$Li_aNiM_bO_2 \quad (9)$$

In Formula 9, $0.90 \leq a \leq 1.1$, and $0.001 \leq b \leq 0.1$.

$$Li_aCoM_bO_2 \quad (10)$$

In Formula 10, $0.90 \leq a \leq 1.1$, and $0.001 \leq b \leq 0.1$.

$$Li_aMnM_bO_2 \quad (11)$$

In Formula 11, $0.90 \leq a \leq 1.1$, and $0.001 \leq b \leq 0.1$.

$$Li_aMn_2M_bO_4 \quad (12)$$

In Formula 12, $0.90 \leq a \leq 1.1$, and $0.001 \leq b \leq 0.1$.

$$DS_2 \quad (13)$$

$$LiDS_2 \quad (14)$$

$$V_2O_5 \quad (15)$$

$$LiV_2O_5 \quad (16)$$

$$LiEO_2 \quad (17)$$

$$LiNiVO_4 \quad (18)$$

$$Li_{3-x}F_2(PO_4)_3 \, (0 \leq x \leq 3) \quad (19)$$

$$Li_{3-x}Fe_2(PO_4)_3 \, (0 \leq x \leq 2) \quad (20)$$

In Formulae 3 to 20, B is Co or Mn; D is Ti or Mo; E is selected from Cr, V, Fe, Sc, and Y; F is selected from V, Cr, Mn, Co, Ni, and Cu; and M is a transition metal or lanthanide selected from the Al, Cr, Mn, Fe, Mg, La, Ce, Sr, V and combinations thereof.

Other nonlimiting examples of suitable positive active materials include inorganic sulfur ($S_8$, elemental sulfur) and sulfur-based compounds. Nonlimiting examples of suitable sulfur-based compounds include $Li_2S_n(n \geq 1)$, $Li_2S_n(n \geq 1)$ dissolved in a catholyte, organic sulfur compounds, and carbon-sulfur polymers ($(C_2S_x)_n$: x=2.5 to 50, n≥2).

Like the negative electrode, the positive electrode may also be fabricated by a method including mixing a positive active material, a binder, and optionally a conductive agent to provide a slurry composition, and coating the slurry composition on a current collector.

A rechargeable lithium battery according to one embodiment of the present invention may further include another element (if necessary) in addition to the positive electrode, the negative electrode, and the electrolyte. For example, a separator separating the positive electrode from the negative electrode may be provided. The separator may include, for example, a micro-porous membrane composed of polyolefin such as polypropylene or polyethylene.

Figure 1:
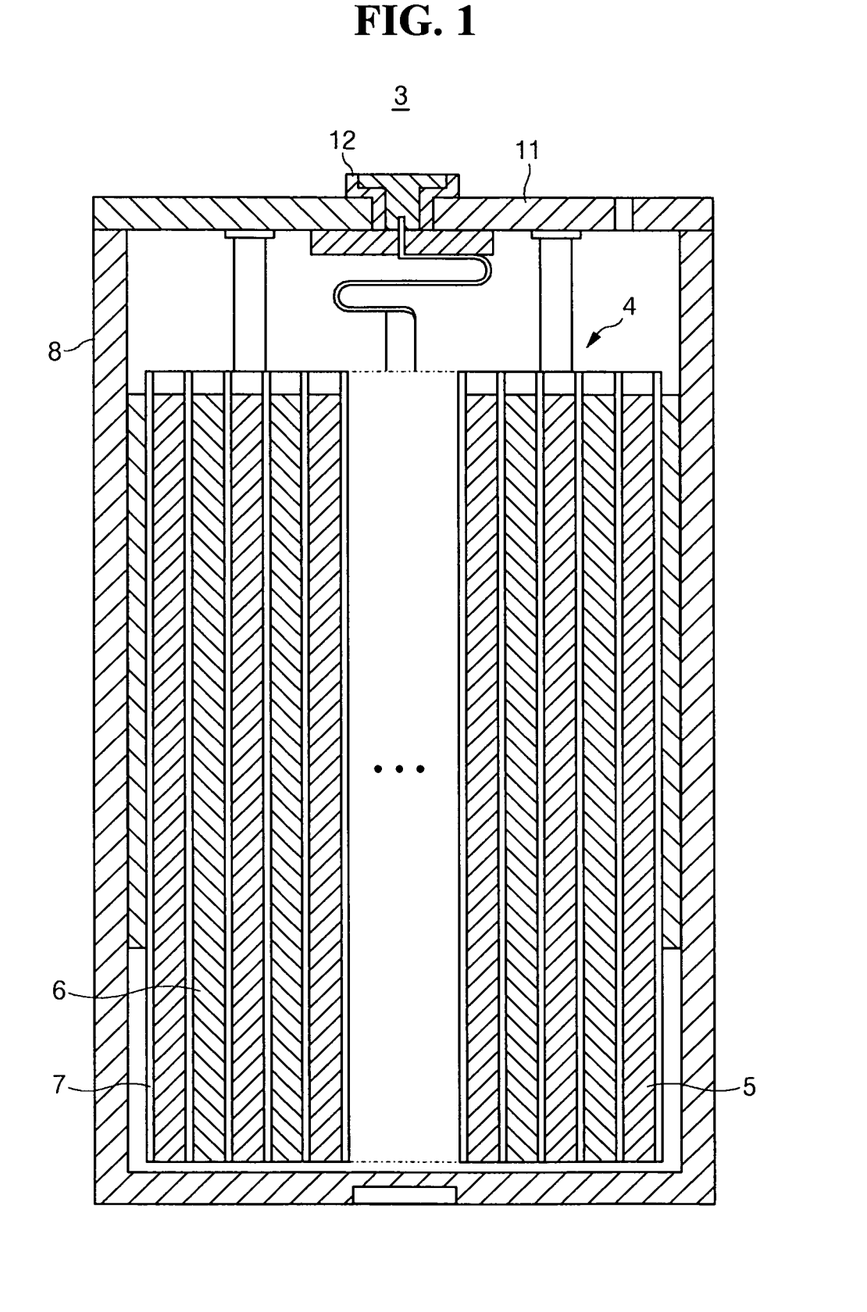
FIG. 1 is a schematic, cross-sectional view of a rechargeable lithium battery according to one embodiment of the present invention.

FIG. 1 is a cross-sectional view of a rechargeable lithium battery according to one embodiment of the present invention. As shown in FIG. 1, the rechargeable lithium battery 3 is fabricated by providing an electrode assembly including a positive electrode 5, a negative electrode 6 and a separator 7 positioned between the positive electrode 5 and negative electrode 6. The electrode assembly 4 is inserted into a case 8, an electrolyte solution is injected into the case 8, and the case is sealed with a plate 11 and gasket 12.

According to one embodiment of the present invention, a rechargeable lithium battery employs a pyrocarbonate-based compound, and the SEI formed on the electrode plate surface decreases the resistance at low temperatures, thereby improving power output characteristics. In addition, the surface of the negative active material that contacts the electrolyte (i.e., the shell part) is made of an amorphous-based carbon, thereby preventing reaction of the active material with the electrolyte, decreasing the irreversible capacity of the negative electrode and obtaining a high-capacity battery.

According to one embodiment of the present invention, the rechargeable lithium ion battery may be used as an energy source for driving a motor of devices such as hybrid electric vehicles (HEVs), electric vehicle (EVs), cordless cleaners, motorbikes, and electric scooters. In addition, the batteries may be used as energy sources for various electrical devices such as portable, mobile phones, game devices, portable televisions, laptop computers, and calculators.

The present invention will now be described with reference to the following examples. These examples are provided for illustrative purposes only and are not intended to limit the scope of the present invention.

Example 1

20 g of an amorphous-based carbon precursor of a phenol resin was dissolved in an organic solvent of tetrahydrofuran to provide a solution with a 20% concentration. 100 g of a crystalline-based carbon of a natural graphite powder was mixed in the solution. The mixed solution was subjected to a reflux reaction and filtered to provide a negative active material precursor powder. The negative active material precursor was heated at 1000° C. for 2 hours to provide a negative active material.

90 g of the resulting negative active material was uniformly mixed with 10 g of a polyvinylidene fluoride binder at a concentration of 8% and a solvent of N-methyl-2-pyrrolidone to provide a slurry. The slurry was coated on a 5.1 cm wide and 178 μm thick copper foil current collector, dried, compressed, and cut to size to provide a negative electrode.

94 g of a $LiCoO_2$ positive active material, 3 g of a Super-P conductive material, and 3 g of a polyvinylidenefluoride (PVDF) binder were dissolved in N-methyl-2-pyrrolidone to provide a positive active material slurry. The provided positive active material slurry was coated on a 4.9 cm wide and 147 μm thick Al-foil, dried, compressed, and cut to size to provide a positive electrode.

A polyethylene film separator was positioned between the positive electrode and the negative electrode and wound to provide an electrode assembly. The electrode assembly was inserted into a battery case and a liquid electrolyte solution was injected into the battery case under reduced pressure to provide a battery cell. For the electrolyte solution, 1.15M $LiPF_6$ was added to a mixed solvent of ethylene carbonate and dimethyl carbonate (3:7 volume ratio) dissolved with 1 wt % dimethyl pyrocarbonate.

Comparative Example 1

20 g of an amorphous-based carbon precursor of a phenol resin was dissolved in an organic solvent of tetrahydrofuran to provide a solution having a concentration of 20%.

100 g of a crystalline-based carbon of a natural graphite powder was mixed into the solution. The mixed solution was subjected to a reflux reaction and filtered to provide a negative active material precursor powder. The negative active material precursor was heated at 1000° C. for 2 hours to provide a negative active material.

90 g of the resulting negative active material was uniformly mixed with 10 g of a binder of polyvinylidene fluoride at 8% concentration and a solvent of N-methyl-2-pyrrolidone to provide a slurry. The slurry was coated on a 5.1 cm wide and 178 μm thick copper foil current collector, dried, compressed, and cut to size to provide a negative electrode.

94 g of a $LiCoO_2$ positive active material, 3 g of a Super-P conductive material, and 3 g of a polyvinylidenefluoride (PVDF) binder were dissolved in N-methyl-2-pyrrolidone to provide a positive active material slurry. The positive active material slurry was coated on a 4.9 cm wide and 147 μm thick Al-foil, dried, compressed, and cut to size to provide a positive electrode.

A polyethylene film separator was positioned between the positive electrode and the negative electrode and wound to provide an electrode assembly. The electrode assembly was inserted into a battery case and a liquid electrolyte solution was injected into the battery case under reduced pressure to provide a battery cell. For the electrolyte solution, 1.15M LiPF$_6$ was added to a mixed solvent of ethylene carbonate and dimethyl carbonate (30:70 volume ratio).

Examples 2 Through 5 and Comparative Examples 2 Through 5

As shown in the following Table 1, the compositions and amounts of the negative active materials and electrolytes were varied to provide the rechargeable lithium cells of Examples 2 through 5.

In the following Table 1, EC represents ethylenecarbonate, DMC represents dimethylcarbonate, DMPC represents dimethylpyrocarbonate, FEC represents fluoroethylenecarbonate, and MCF represents meso carbon fiber.

TABLE 1

|   | Negative active material | Non-aqueous organic solvent (volume ratio) | | Electrolytic salt | Pyrocarbonate-based compound (wt %) |
|---|---|---|---|---|---|
| Ex. 1 | Crystalline-based carbon core: natural graphite amorphous-based carbon precursor: phenol resin | EC (3) | DMC (7) | LiPF$_6$ 1.15M | DMPC (1 wt %) |
| Ex. 2 | Crystalline-based carbon core: natural graphite amorphous-based carbon precursor: phenol resin | EC (3) | DMC (7) | LiPF$_6$ 1.15M | DMPC (3 wt %) |
| Ex. 3 | Crystalline-based carbon core: natural graphite amorphous-based carbon precursor: phenol resin | EC (3) | DMC (7) | LiPF$_6$ 1.15M | DMPC (5 wt %) |
| Ex. 4 | crystalline-based carbon core: natural graphite amorphous-based carbon precursor: phenol resin | EC (3) | DMC (7) | LiPF$_6$ 1.15M | Ethylmethyl pyrocarbonate (3 wt %) |
| Ex. 5 | Crystalline-based carbon core: natural graphite amorphous-based carbon precursor: phenol resin | EC (3) | DMC (7) | LiPF$_6$ 1.15M | Diethyl pyrocarbonate (3 wt %) |
| Comp. Ex. 1 | Crystalline-based carbon core: natural graphite amorphous-based carbon precursor: phenol resin | EC (3) | DMC (7) | LiPF$_6$ 1.15M | — |
| Comp. Ex. 2 | MCF | EC (3) | DMC (7) | LiPF$_6$ 1.15M | DMPC (1 wt %) |

The rechargeable lithium cells prepared according to Examples 1 and 2 and Comparative Example 1 were measured for AC impedance upon scanning from 1 MHz to 10 mHz under conditions of 60% SOC at a temperature of −30° C. The results are shown in FIG. 2.

Figure 2:
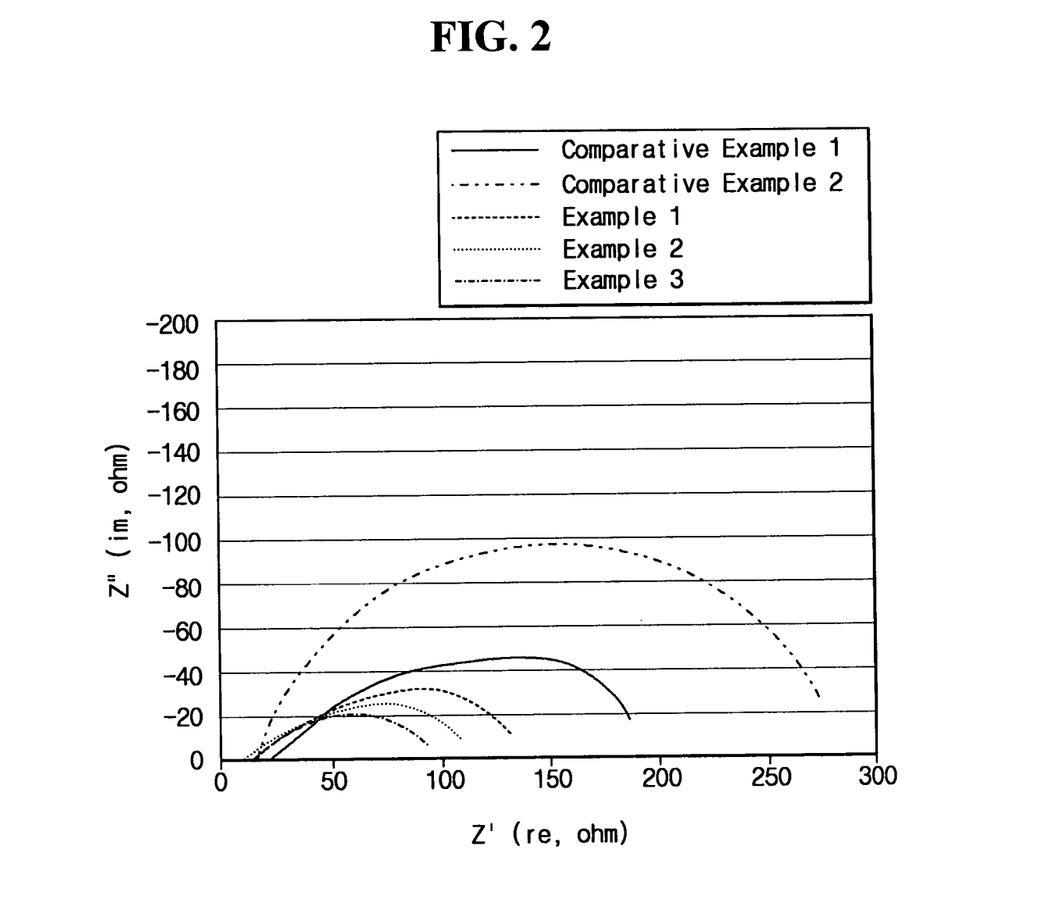
FIG. 2 is a graph of the effects of decreasing the low temperature resistance of the rechargeable lithium batteries prepared according to Examples 1 through 3 and Comparative Examples 1 and 2.

In the graph shown in FIG. 2, the point of intersection indicates resistance of the cell, and the half circle indicates resistance due to the SEI formed on the electrode plate surface. The smaller the diameter of the half circle, the lower the resistance caused by the SEI.

As shown in FIG. 2, the rechargeable lithium cells prepared according to Examples 1 through 3, which include pyrocarbonate additives have remarkably lower resistances to the charge mobility compared to the cells prepared according to Comparative Examples 1 and 2. It is also shown that the rechargeable lithium cells prepared according to Examples 2 and 3, including 3 wt % and 5 wt % pyrocarbonate, have lower resistances than that prepared according to Example 1, including 1 wt % pyrocarbonate. From these results, lower resistances are achieved by increasing the amount of the pyrocarbonate-based additive.

According to one embodiment of the present invention, a rechargeable lithium battery has decreased resistance at low temperature, thereby increased power output. In addition, the rechargeable lithium battery achieves high capacity by preventing reaction between the negative active material and the electrolyte, thereby decreasing the irreversible capacity of the negative electrode.

While this invention has been illustrated and described in connection with certain exemplary embodiments, it is understood by those of ordinary skill in the art that various modifications and changes to the described embodiments may be made without departing from the spirit and scope of the present invention, as defined in the appended claims.

What is claimed is:

1. A rechargeable lithium battery comprising:
   an electrolyte comprising a non-aqueous organic solvent comprising an ethylene carbonate-based compound, a pyrocarbonate-based additive, and a lithium salt, wherein the pyrocarbonate additive is present in the electrolyte in an amount ranging from about 0.01 to about 5 wt % based on the total weight of the electrolyte, the pyrocarbonate-based additive being selected from the group consisting of dimethylpyrocarbonate, diethyl pyrocarbonate, methylethyl pyrocarbonate, methylpropyl pyrocarbonate, methylbutyl pyrocarbonate, methyldecyl pyrocarbonate, ethyldodecyl pyrocarbonate, ethylcetyl pyrocarbonate, di-2-ethylhexyl pyrocarbonate, di-tert-butyl pyrocarbonate, and combinations thereof;
   a negative electrode comprising a negative active material comprising a crystalline-based carbon core and an amorphous-based carbon shell surrounding the crystalline-based carbon core, and the amorphous-based carbon shell consists essentially of an amorphous-based carbonaceous material; and
   a positive electrode comprising a positive active material.

2. The rechargeable lithium battery of claim 1, wherein the ethylene carbonate-based compound is represented by Formula 1:

(1)

wherein each of X and Y is independently selected from the group consisting of hydrogen, halogens, cyano (CN) groups, nitro ($NO_2$) groups, and C1 to C5 haloalkyl groups, and at least one of X and Y is selected from the group consisting of halogens, cyano (CN) groups, nitro ($NO_2$) groups, and C1 to C5 haloalkyl groups.

3. The rechargeable lithium battery of claim 1, wherein the ethylene carbonate-based compound is present in the electrolyte in an amount ranging from about 10 to about 60 wt % based on the total weight of the electrolyte.

4. The rechargeable lithium battery of claim 1, wherein the ethylene carbonate-based compound is present in the electrolyte in an amount ranging from about 15 to about 40 wt % based on the total weight of the electrolyte.

5. The rechargeable lithium battery of claim 1, wherein the non-aqueous-based organic solvent further comprises a linear carbonate-based compound.

6. The rechargeable lithium battery of claim 5, wherein the ethylene carbonate-based compound and linear carbonate-based compound are present in the electrolyte in a volume ratio ranging from about 1:1 to about 1:9.

7. The rechargeable lithium battery of claim 5, wherein the linear carbonate-based compound is selected from the group consisting of dimethyl carbonate, diethyl carbonate, ethylmethyl carbonate, methylpropyl carbonate, ethyl butyrate, methyl butyrate, and combinations thereof.

8. The rechargeable lithium battery of claim 1, wherein the pyrocarbonate-based additive is selected from the group consisting of dimethylpyrocarbonate, diethyl pyrocarbonate, methylethyl pyrocarbonate, and combinations thereof.

9. The rechargeable lithium battery of claim 1, wherein the pyrocarbonate-based additive is present in the electrolyte in an amount ranging from about 0.5 to about 3 wt % based on the total weight of the electrolyte.

10. The rechargeable lithium battery of claim 1, wherein the lithium salt is selected from the group consisting of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(C_xF_{2x+1}SO_2)(C_yF_{2y+1}SO_2)$ wherein x and y are natural numbers, LiCl, LiI, lithium bis(oxalate) borate, and combinations thereof.

11. The rechargeable lithium battery of claim 1, wherein the crystalline-based carbon core is selected from the group consisting of natural graphite and artificial graphite.

12. The rechargeable lithium battery of claim 1, wherein the positive active material comprises a compound capable of reversibly intercalating and deintercalating lithium ions.

13. The rechargeable lithium battery of claim 1, wherein the positive active material is selected from the group consisting of lithium-containing compounds represented by Formulae 3 to 20:

$LiNiO_2$ (3)

$LiCoO_2$ (4)

$LiMnO_2$ (5)

$LiMn_2O_4$ (6)

$Li_aNi_bB_cM_dO_2$ (7)

wherein $0.90 \le a \le 1.1$, $0 \le b \le 0.9$, $0 \le c \le 0.5$, and $0.001 \le d \le 0.1$, $Li_aNi_bCo_cMn_dM_eO_2$ (8)

wherein $0.90 \le a \le 1.1$, $0 \le b \le 0.9$, $0 \le c \le 0.5$, $0 \le d \le 0.5$, and $0.001 \le e \le 0.1$, $Li_aNiM_bO_2$ (9)

wherein $0.90 \le a \le 1.1$, and $0.001 \le b \le 0.1$, $Li_aCoM_bO_2$ (10)

wherein $0.90 \le a \le 1.1$, and $0.001 \le b \le 0.1$, $Li_aMnM_bO_2$ (11)

wherein $0.90 \le a \le 1.1$, and $0.001 \le b \le 0.1$, $Li_aMn_2M_bO_4$ (12)

wherein $0.90 \le a \le 1.1$, and $0.001 \le b \le 0.1$, $DS_2$ (13)

$LiDS_2$ (14)

$V_2O_5$ (15)

$LiV_2O_5$ (16)

$LiEO_2$ (17)

$LiNiVO_4$ (18)

$Li_{3-x}F_2(PO_4)_3$ ($0 \le x \le 3$) (19)

$Li_{3-x}Fe_2(PO_4)_3$ ($0 \le x \le 2$) (20)

wherein B is selected from the group consisting of Co and Mn; D is selected from the group consisting of Ti and Mo; E is selected from the group consisting of Cr, V, Fe, Sc, and Y; F is selected from the group consisting of V, Cr, Mn, Co, Ni, and Cu; and M is selected from the group consisting of Al, Cr, Mn, Fe, Mg, La, Ce, Sr, V and combinations thereof.

* * * * *

UNITED STATES PATENT AND TRADEMARK OFFICE
CERTIFICATE OF CORRECTION

PATENT NO. : 8,574,771 B2
APPLICATION NO. : 11/647771
DATED : November 5, 2013
INVENTOR(S) : Hyun-Seok Kim et al.

Page 1 of 1

It is certified that error appears in the above-identified patent and that said Letters Patent is hereby corrected as shown below:

In the Claims

Column 10, Claim 1, line 51  Delete "dimethylpyrocarbonate,"
Insert -- dimethyl pyrocarbonate, --

Column 11, Claim 5, line 26  Delete "non-aqueous-based"
Insert -- non-aqueous --

Column 11, Claim 8, line 39  Delete "dimethylpyrocarbonate,"
Insert -- dimethyl pyrocarbonate, --

Signed and Sealed this
Sixteenth Day of June, 2015

Michelle K. Lee
*Director of the United States Patent and Trademark Office*